United States Patent [19]

Gould

[11] 4,075,426
[45] Feb. 21, 1978

[54] PARALLEL SILENT COMMUNICATOR

[76] Inventor: Harvey Mitchell Gould, 270 High St., Clinton, Mass. 01510

[21] Appl. No.: 666,261

[22] Filed: Mar. 12, 1976

[51] Int. Cl.² .......................................... H04M 11/08
[52] U.S. Cl. .................................... 179/1 H; 179/37; 179/84 C
[58] Field of Search .............. 179/1 H, 2 A, 2 DP, 179/18 AD, 18 B, 18 BF, 27 FC, 37–40, 84 C, 84 L; 178/99, 17 C; 340/381, 378, 365 R, 365 S, 337

[56] References Cited

U.S. PATENT DOCUMENTS

| | | | |
|---|---|---|---|
| 3,405,234 | 10/1968 | West | 179/2 A |
| 3,584,151 | 6/1971 | Kielar | 179/1 H |
| 3,727,003 | 4/1973 | Paraskevakos | 179/5.5 |
| 3,767,859 | 10/1973 | Doering et al. | 179/1 H |
| 3,833,765 | 9/1974 | Hilborn et al. | 178/17 C |
| 3,928,732 | 12/1975 | Simon et al. | 179/27 FC |

Primary Examiner—Kathleen H. Claffy
Assistant Examiner—Gerald L. Brigance
Attorney, Agent, or Firm—Flam & Flam

[57] ABSTRACT

A parallel silent communication system comprises a secretary or phone operator console and an executive console. The executive console has a screen for visual display (discretely visible only to the executive to avoid interruptions to clients, callers, patients or visitors) of an unlimited language message composed remotely by the secretary or phone operator on her keyboard. A limited language or coded message may be returned by selecting one of a series of buttons or switches at the executive console which communicates specific directions or other responses to the secretary or phone operator at her keyboard. The pre-established communication channel need not be intercepted and can discretely be maintained unless the executive chooses to interrupt.

4 Claims, 3 Drawing Figures

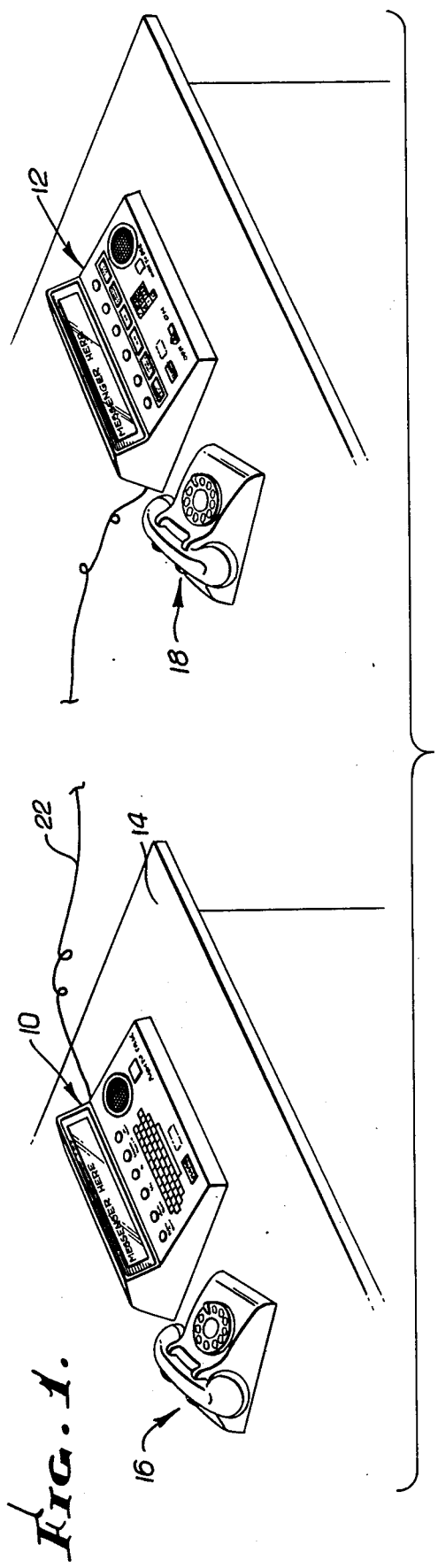
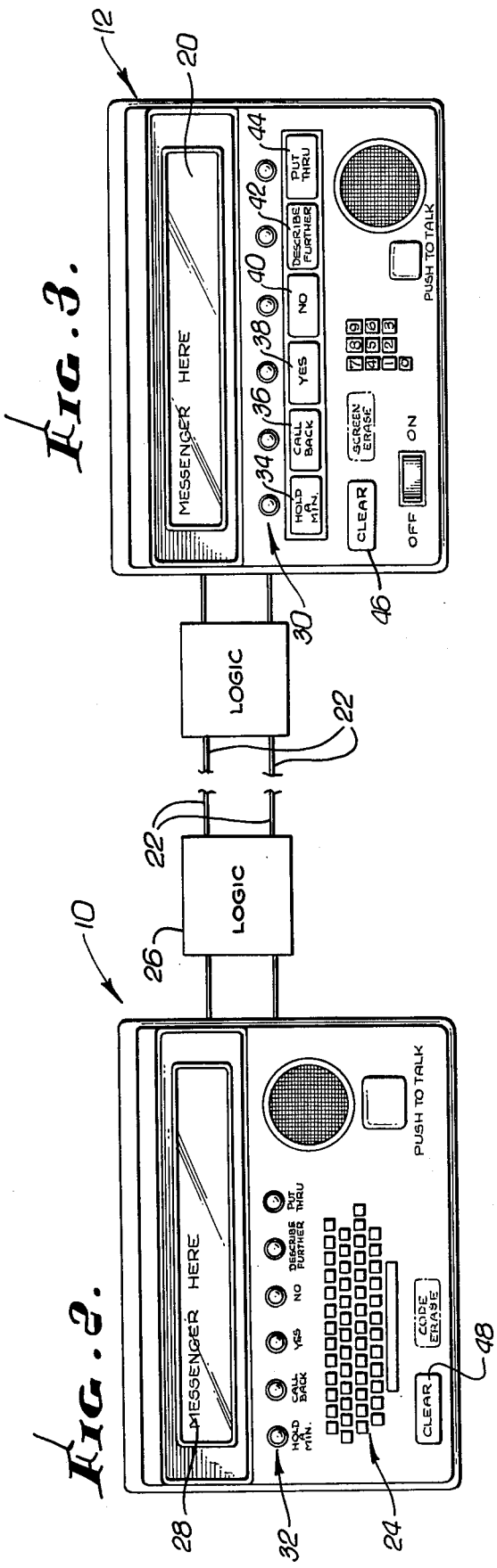

4,075,426

PARALLEL SILENT COMMUNICATOR

FIELD OF INVENTION

This invention relates to communication equipment such as for inter-office use between a professional (i.e. executive, lawyer, doctor, psychiatrist, etc., herein collectively referred to as "executive") and his secretary or telephone operator.

BACKGROUND OF THE INVENTION

A difficult problem of communication management is that of determining whether one channel of communication should be interrupted in order that another channel of communication be established. An executive may deem it annoying, inappropriate or unwise to interrupt an ongoing telephone or in-person conversation in order to dispatch instructions to his secretary or telephone operator concerning another incoming call particularly when the interruption turns out to be a less important matter which he can deal with at a later time. Alternatively, in some instances, the executive may want to be interrupted to attend to priority business. To avoid any discourtesy in the former case, it may be best to signal the secretary or operator in some silent manner parallel to the existing communication channel in order to avoid a discontinuity. The regular telephone hold and intercom is inadequate for this purpose as it produces an audible interruption and objectionable hiatus. Accordingly, a silent parallel communicating link is required. In the past it has been common for executivee to use some kind of buzzer system and code; but the buzzers aren't silent (which is annoying) and the language and messages capable of being so transmitted are limited. The primary object of the present invention is to provide a parallel communicating link for an executive that makes possible intelligent communication without disrupting the ongoing communication channel.

SUMMARY OF INVENTION

In order to accomplish the foregoing objective, I provide a visual screen for alphanumeric display of messages composed by the sender, all without limit. The return message is a selected one of a limited group. The combination of a limitless language on the send run combined with a limited language on the return run makes possible inconspicuous but yet limitless transmission of intelligence.

BRIEF DESCRIPTION OF DRAWINGS

A detailed description of the invention will be made with reference to the accompanying drawings wherein like numerals designate corresponding parts in the several figures.

FIG. 1 is a diagrammatic view of a system incorporating the present invention.

FIG. 2 is a diagrammatic representation of the operator console.

FIG. 3 is a diagrammatic view of the executive console.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention since the scope of the invention is best defined by the appended claims.

In FIG. 1 there is illustrated a pair of communication consoles 10 and 12. The console 10 is located at a desk or station 14 where incoming telephone calls are received as indicated by the phone unit 16. In practice, the console may link with other equipment or be modified to serve as a standard office typewriter when messages are not being transmitted. The console 12 may be one of a group of consoles serviced by the operator console 10. The console 12 is located in the office of the executive at a place where it is in his usual line of sight (but out of sight of a client or visitor) and where it may inconspicuously be operated, as during the course of a conference or use of a phone unit 18. The alphanumeric display screen may even be separated from the console and attached to the telephone (e.g. "call director" style telephone) with the console and switches attached elsewhere (e.g. on desk below eye-level).

The console 12 has a screen 20 for non-audible display of a message. The message is sent through a wire or wireless link indicated by the line 22 from the operator console 10. The operator composes the message on typewriter keyboard 24, the message being converted to a visual display at the screen 20 by a logic unit 26 of conventional form. Preferably the operator console 10 also includes a screen 28 that is the counterpart of the executive console screen 20 for visual verification of the message sent. If may also include a "print-out" mechanism for a permanent record of messages. The message may be of any typical type such as:

1. Ed Jones from New York, line 3.
2. Messenger here.
3. Due at 3:15 meeting.
4. Stuck on ITT contract.
5. Lab results are
6. Next patient here.
7. Etc.

If the executive cares to interrupt his communication channel, he may use an audio intercom that may be incorporated in the units 10 and 12. But if he wishes not to interrupt the existing channel, he may dispatch a silent selected return message in code by operating one of a series of key switches or buttons 30 (FIG. 3). Indicators 32 are located at the operator's console 10 to show which of his switches or buttons the executive operated. In the present exemplar, there are six message buttons 34, 36, 38, 40, 42 and 44 and a clear button 46. Each transmits a pre-selected code message (which may flexibly be decided upon by the Executive and his secretary pursuant to their most frequently encountered types of responses) such as:

1. Please have him hold a minute.
2. I'll call back.
3. Yes.
4. No.
5. Describe further.
6. Put through.

Each key switch or button 34, 36, 38, 40, 42 and 44 is of the type that includes an indicator light at both consoles to show its operation. Preferably each button 34, 36, 38, 40, 42 and 44 has an associated holding circuit whereby the message bottom remains illuminated until the clear button 46 is operated. Initiation of operation of the keyboard 22 also operates to parallel the clear button 46 thus to erase the return message. The operation console in a known manner also provides a clear button 48 for the screens 20 and 28. As indicated in dotted lines, the executive console may also have a clear button for the screeens and the operator console 10 may have a clear button for the code message elements.

The audio intercom elements are illustrated in FIGS. 2 and 3, and labeled "PUSH TO TALK". If desired, inaudible printing devices may be used so that a permanent record is provided.

An executive can traffic his communications in an expeditious manner without notice in the established communication channel. Various accessories can be incorporated in the consoles. For example, when not in use for communication, the screen may display time, temperatures or the like. The executive console can readily incorporate a digital clock mechanism or calculation logic and calculator keyboard elements for numeric service by the screen 20 when messages are not being transmitted.

Intending to claim all novel, useful and unobvious features shown or described, I make the following claims:

1. In a parallel silent communicator:
   (a) a pair of communicator units for an executive station console and an operator station console;
   (b) said unit for said executive station having a screen for silent visual display of alphanumeric information as well as a set of individual switch elements corresponding to coded limited language messages;
   (c) said unit for said operator station having a keyboard for composing silent unlimited language alphanumeric messages as well as a set of individual indicators corresponding to said switch elements;
   (d) a communication link between said units;
   (e) logic units for converting said alphanumeric messages to a visual display at said executive station; and
   (f) means for switching said indicators to an "ON" state by operation of the corresponding switch element at the executive station.

2. The communicator as set forth in claim 1 together with a visual verification screen at said operator station to provide a display corresponding to the transmitted alphanumeric message.

3. The communicator as set forth in claim 1 together with means accessible at both the Executive and operator consoles for clearing the visual display at said screen, and means accessible at both the executive and operator consoles for switching said indicators to an "OFF" state.

4. A method of silent conference break-in communication between a message center and a remote private conference office having an audio communication channel between the office and the center, said method utilizing an office console having both a visual display screen and a manually operable limited language message sending unit, and utilizing at said center both an unlimited language message sending unit for display on said screen and a limited language receiving unit, said method comprising:
   (a) concealing the visual display from the conferees for view only by the operator of the office console;
   (b) transmitting from the message center by the aid of its said sending unit, an unlimited language message for display on said screen;
   (c) coding the limited language of said office sending unit and center receiving unit including a code element corresponding to a request for explanatory and/or further unlimited communication;
   (d) returning a limited language message back to the center by the aid of said office sending unit; and
   (e) exercising an option during the conference for use or nonuse of said independent audio link.

* * * * *